United States Patent [19]

Kilsby et al.

[11] Patent Number: 5,377,626
[45] Date of Patent: Jan. 3, 1995

[54] LUNGE LINE CONTROLLER

[76] Inventors: Celia Kilsby, 170 Mission Vineyard Rd., San Juan Bautista, Calif. 95045; Frank C. King, 15210 Yvonne Dr., Morgan Hill, Calif. 95037

[21] Appl. No.: 58,383

[22] Filed: May 10, 1993

[51] Int. Cl.$^6$ .............................................. A01K 27/00
[52] U.S. Cl. ........................................ 119/796; 54/71; 242/384.7; 242/376
[58] Field of Search ................... 119/789, 794, 796; 242/96, 107.3, 107.6, 107.7, 107.12; 54/71, 34

[56] References Cited

U.S. PATENT DOCUMENTS

| | | | |
|---|---|---|---|
| 887,689 | 5/1908 | Olop . | |
| 2,217,323 | 10/1940 | Sackett . | |
| 2,249,114 | 7/1941 | Coffman . | |
| 2,314,504 | 3/1943 | Lifchultz . | |
| 2,647,703 | 4/1953 | Hayes . | |
| 2,776,644 | 1/1959 | Fontaine . | |
| 2,919,676 | 1/1960 | Schneider . | |
| 3,315,642 | 4/1967 | Rogers . | |
| 3,853,283 | 12/1974 | Croce et al. | 242/107.4 |
| 3,937,418 | 2/1976 | Critelli | 119/796 |
| 4,018,189 | 4/1977 | Umphries et al. . | |
| 4,068,383 | 1/1978 | Krebs | 33/138 |
| 4,165,713 | 8/1979 | Brawner . | |
| 4,197,817 | 4/1980 | Crutchfield . | |
| 4,202,510 | 5/1980 | Stanish | 242/107.4 |
| 4,562,792 | 1/1986 | Pak/Kum . | |
| 4,748,937 | 6/1988 | Musetti . | |
| 4,765,557 | 8/1988 | Kahmann | 242/107.3 |
| 4,773,623 | 9/1988 | Nabinger | 248/330 |
| 4,856,726 | 8/1989 | Kang | 242/107.3 |
| 4,887,551 | 12/1989 | Musetti . | |
| 4,964,370 | 10/1990 | Peterson . | |
| 5,245,761 | 9/1993 | Waldherr | 242/107.3 |

FOREIGN PATENT DOCUMENTS

| | | | |
|---|---|---|---|
| 2251259 | 6/1975 | France | 119/796 |
| 155598 | 11/1904 | Germany | 119/796 |
| 788170 | 12/1957 | United Kingdom | 119/794 |
| 1678263 | 9/1991 | U.S.S.R. | 119/796 |

*Primary Examiner*—Gene Mancene
*Assistant Examiner*—Todd E. Manahan

[57] ABSTRACT

A lunge line controller (20) which can be easily and conveniently operated by one hand for lunging a horse for training or exercising purposes while avoiding injury to the operator or the animal, includes a housing (22) in which a reel (26) is disposed and pivoted on a shaft (60). The reel includes a cylindrical central hub (96) containing a spring (30). The reel has planar circular flanges (106) that project outwardly from both outer surfaces and includes evenly spaced teeth (112) on the outside of the flanges. The spring connects to the shaft to urge the reel in one direction of rotation. A flexible tape (32) is connected to the reel and extends out of the housing and has a clip (36) at its free end. When in a release position, the spring rotates the reel, thus coiling the tape around the reel until the clip reaches the housing. The latching means (28) comprises an actuation and locking button (38) biased by a spring (132) to an outward position. The button comprises two rectangular portions, i.e., a back rectangular portion (134) which extends to a transverse rectangular portion (136). The back rectangular portion extends out of the housing and includes an angled outer end (142). The back rectangular portion also includes a locking notch (144) on its underside that can be hooked onto the housing to hold the button in position. The transverse rectangular portion of the button includes two projecting fingers (138) that provide interference with the teeth (112) on the reel. This configuration allows the operator to select three separate functions by pushing the button, i.e., the tape can either be (1) freely paid-out and retracted, (2) locked against pay-out or retraction, or (3) momentarily-locked against pay-out or retraction.

8 Claims, 3 Drawing Sheets

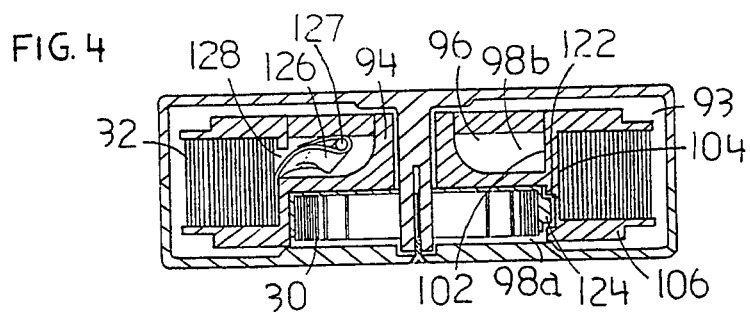
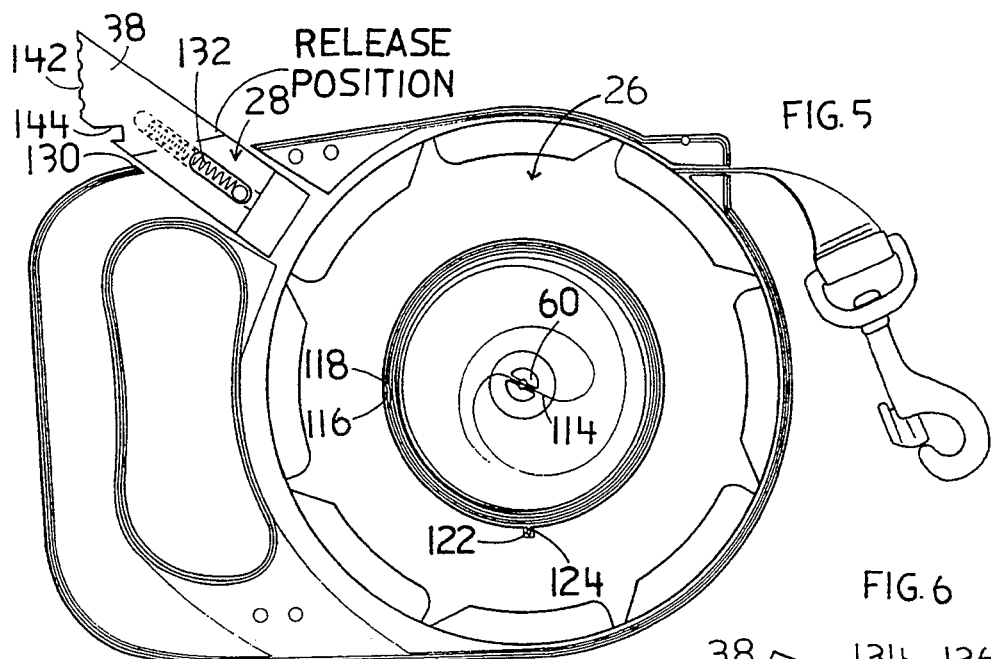
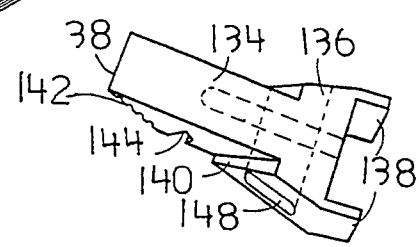
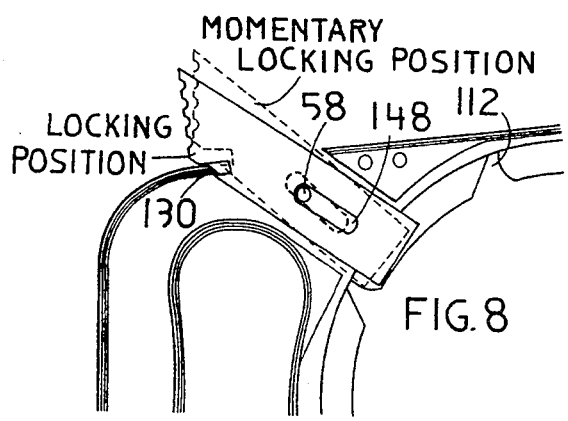
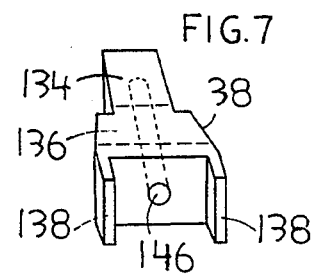

LUNGE LINE CONTROLLER

BACKGROUND-FIELD OF THE INVENTION

This invention relates to home training, specifically a device to retract a lunge line used for lunging horses.

BACKGROUND-DISCUSSION OF PRIOR ART

People who work with horses, either for pleasure or as professionals typically use a lunge line for the horse's training or exercising needs. The lunge line is usually a length of tape, generally made of nylon or cotton webbing, from 6–10 meters long. The lunge line is secured to the horse's halter or bridle by a clip attached to one end of the lunge line. The lunge line is then let out to the desired length by the operator while the horse moves in a circular direction around the operator.

Typically, the excess tape is wrapped in loops around the hand of the operator who is required to gather and expel the tape as needed to determine the diameter of the lunging circle and to prevent any tape slack. A lunge whip (approximately 3–5 meters long) is often used to keep the horse at the outside diameter of the lunging circle and moving forward. This whip is very often held in the same hand that is handling the excess line.

The use of a lunge line has always been somewhat dangerous as the operator is required to contend with a lunge line that continuously requires adjusting, as well as a lunge whip to keep the horse at the required distance and pace. In practice this means that there is often excess tape wrapped around the operator's hand or that is left on the ground around the operator's feet, or sometimes even wrapped about the operator's body. The reader can appreciate the possible dangers that an animal of this size, weight, and strength is capable of inflicting upon the person handling it. It is imperative that the handler of a large animal be constantly aware of the animal's actions and not preoccupied with the operation of a training or exercising device. E.g., if the line is wrapped around the operator's hand, foot, or body, and the horse pulls or runs away, the operator can be caught in the lunge line, causing serious injury. In addition, the sudden pull of the horse can pull the lunge line through the operator's hand at a rapid pace, causing injury such as "rope burn."

The horse is also susceptible to injury with the conventional lunge line. For example, if excess slack is left in the lunge line at any time, the horse's legs can easily become entangled. This situation can cause serious injury to the horse.

Heretofore, there is no practical way to avoid these problems.

A variety of retractable animal leashes, reels, and tape measures are known, e.g., from U.S. Pat. Nos. 4,964370 to Peterson (1990), 4,887,551 (1989) and 4,748,937 (1988) to Musetti, and 4,165,713 (1979) and 4,018,189 (1977) to Umphries and Brawner. However, retractable animal leashes have been designed for handling small animals only. For example, some devices are so small they are designed to be held in the palm of a hand, or to be continuously mounted on an animal's collar. These small animal devices are unsuitable for large animals. For example, a palm-held device would not provide the necessary grip required to control a large animal. Also, a device designed to be permanently attached to an animal via a collar would not be feasible since halters or bridles are not normally continuously worn by a large animal such as a horse. In addition, most of these types of leashes have no means provided to lock the tape against pay-out or retraction.

Several inventors have designed retractable leashes with some type of apparatus to restrict or lock the leash from being retracted or being paid-out. Many of these have very complex designs, requiring many parts and complicated or lengthy manufacturing, as well as being complicated to operate. Examples include the devices of U.S. Pat. No. 3,853,283 to Croce and Bayer (1974) which requires a complex combination of pawls and cams as well as an actuation button, U.S. Pat. No. 2,647,703 to Hayes (1950) which requires a complex arrangement of dogs, ears, and locking arms to provide braking necessary to lock the line, and U.S. Pat. No. 2,217,323 to Sackett (1938) which requires a very complex arrangement of brake levers and brake shoes, as well as an actuation button.

Previous retractable devices that include the capability to restrict tape pay-out or retraction do so by arranging the stop mechanism, usually a pin of some design, to engage teeth or holes located on a reel which holds the tape. This action prevents the reel from moving. These devices provide the teeth or holes on only one side of a reel flange. This design is unacceptable as the pull from a large animal, such as a horse, would exert most of the pressure on the side of the reel with the teeth or holes, causing an uneven pull. The uneven pull compromises the durability and reliability of the device and causes excess wear which promotes product failure, i.e., the teeth can break or the shaft around which the reel rotates can bend etc. This unbalanced stop arrangement can also cause the device to twist in the operator's hand, usually at the moment when the pull is strongest, which is when the operators grip must be the most secure. Some examples of this type of design are shown in U.S. Pat. No. 4,068,383 to Krebs, (1978), 3,853,283 to Croce and Bayer (1974), 2,314,504 to Lifchultz (1940) and 2,217,323 to Sackett (1938).

Another disadvantage found in previous devices is that the stop mechanism design requires the operator to inconveniently continuously exert pressure on a button or other means to keep the tape in a locked or released status. As previously stated, an operator controlling a large animal needs to direct as much attention to the animal's actions as possible, making a device that is simple to operate highly desirable. Examples of previous devices that require continuous and inconvenient operation of a stop or release mechanism to lock the device against tape rotation or release the tape to rotate are shown in U.S. Pat. No. 4,202,510 to Stanish (1980), 4,068,383 to Krebs (1978), 3,315,642 to Rogers (1967), 2,776,644 to Fontaine (1957), 2,249,114 to Coffman (1941) and 887,689 to Olop (1908).

In addition to the above disadvantages, previous devices have unacceptable tape locking designs for large animals. For example, the devices of U.S. Pat. No. 4,773,623 to Nabinger (1988) lock the tape in an extended position, but only allow release by slowly pulling the tape further out of the housing to disengage the locking mechanism. Another example is shown in U.S. Pat. No. 4,562,799 to Pak and Kim (1986) which includes a lever that squeezes the tape itself to slow its pay-out or retraction. Another example is shown in U.S. Pat. No. 4,197,817 to Crutchfield (1980). This design uses a wedge-shaped latch element to squeeze the tape against the housing to slow or stop tape movement.

These devices cannot reliably keep a tape locked, or prevent slippage against the strong pull of a large animal, such as a horse.

In addition to possible slippage, squeezing the tape to stop retraction or pay-out causes excess wear to the tape itself. This results in a shorter product life.

Still another example of an unacceptable locking design for a large animal is shown in U.S. Pat. No. 2,919,676 to Schneider (1960). This device is operated by a gravitational actuated pawl-like arm. The arm stops the tape from pay-out when pointed downward and releases the tape to allow for tape pay-out when pointed upward. This design is unacceptable as the movement of a large animal could pull the device in a direction not desired by the operator, thus releasing or locking the tape when the opposite is desired.

Finally, many previous devices have unacceptable tape or leash requirements. For example, U.S. Pat. No. 4,773,623 to Nabinger (1988) shows a line consisting of a cord, wire, or cable, as well as a variety of other circular types of line. A circular line is unacceptable as it could cause serious injury if it became entangled about the animal. A cord would cut flesh much deeper than a flexible tape if entanglement did occur. Another example is U.S. Pat. No. 4,202,510 to Stanish (1980) which shows a plastic tape reinforced with fiberglass. This type of tape would not be practical as it would not provide the flexibility necessary for a long tape (6–10 meters) required for lunging.

Many of the above devices not only have the disadvantages specifically mentioned, but also include some of the disadvantages of other devices. I.e., the retractable leash devices, reels, and tape measures heretofore known suffer from the following disadvantages:

a) They have cumbersome methods of actuating pay-out or retraction of the tape when in use. For example, one must pre-select desired action or use two hands to operate both the device and restrict tape pay-out or retraction.

b) They require the operator to continuously hold a button or lever when pay-out or retraction of the tape is desired.

c) They have cumbersome and complex designs for achieving pay-out or retraction of the tape, d) They provide tape locking capability only against pay-out of the line or providing tape locking capability only against retraction of the line.

e) They provide no momentary-tape locking capabilities in combination with fixed tape locking and fixed tape release capabilities.

f) Their locking mechanism that engages teeth or holes located on only one side of a reel or spool. This design is not acceptable as the pull from a large animal would be one-sided, compromising product durability and reliability, as well as causing the device to twist in the operator's hand, compromising the required grip to maintain control.

g) Their locking mechanisms use friction in their designs, such as squeezing the tape to restrict tape pay-out or retraction, which promotes excessive wear on the tape leading to shortened product life, as well as allowing tape slippage.

h) The means of holding the device or the size of the device itself is of such a size or shape to be inappropriate for the use with an animal the size and strength of a horse.

i) Manufacturing requires many parts and lengthy assembly.

j) They require a tape which is not suitable for use with a large animal such as a horse. For example, cords that could cause serious injury to the animal, or operator, or both if entanglement occurred.

Objects and Advantages

Accordingly, several objects and advantages of our invention are:

(a) to provide a retractable lunge line with a novel stop arrangement that can easily and conveniently, freely pay-out or retract a tape, lock a tape against pay-out or retraction, and momentarily lock a tape against pay-out or retraction.

(b) to provide a retractable lunge line that can perform the functions describe in (a) above by pushing a single actuating button located on a housing that is operated by a single hand, (c) to provide a retractable lunge line that can remain in a free or unlocked position which provides tension to the tape while in use, thus disallowing excessive slack in the tape. Any excess tape slack could cause the tape to loop and become wrapped around the operators or the horse's body, (d) to provide a retractable lunge line that can be locked to brake at any position desired along the length of the tape, (e) to provide a retractable lunge line that can be engaged in the locked position without continuous pressure on a button, lever or other means, (f) to provide a retractable lunge line that can quickly retract the tape by means of a spiral spring to allow for convenient organization of the tape for storage when not in use, (g) to provide a retractable lunge line that is easier to handle and safer to use than the existing lunge line currently used, (h) to provide a retractable lunge line that does not require the operator's hand to come into contact with the tape, thus reducing the possibility of injury to the hand if the tape is pulled at a fast speed, which can occur if the horse unexpectedly pulls or runs away, (i) to provide a retractable lunge line with a stop mechanism that will allow uniform pull on the housing. A uniform pull will prolong product life and will not cause the housing to twist in the operators hand when the animal pulls against the tape, j) to provide a retractable lunge line that does not allow the tape to twist and is therefore suitable for use with a variety of dips for attachment to the animal's halter. Most conventional lunge lines use a swivel type clip in an effort to reduce the mount of twisting in the tape caused by continuous circling by the animal around the operator, (k) to provide a retractable lunge line that has a comfortable and sturdy handle to provide the necessary grip required for lunging or handling a large animal.

Further objects and advantages are to provide a retractable lunge line which is simply constructed, durable, and easy to manufacture, which is suitable for use with a large animal, which is relatively lightweight and of sufficient size to be held by one hand, which can be easily operated by anyone, which can use a variety of material for the tape, i.e., nylon, cotton, etc. and finally which can be offered in a variety of colon to coincide with the operators selected color scheme.

Still further objects and advantages will become apparent from a consideration of the ensuing description and drawings.

DRAWINGS FIGURES

FIG. 4 is a sectional view of the assembled lunge line controller taken along line 4—4 of FIG. 1;

FIG. 5 is a perspective view of the assembled lunge line controller with the second housing section removed;

FIG. 6 is a side view of the actuating button that is shown in FIG. 1;

FIG. 7 is a back view of the actuation button shown in FIG. 6;

FIG. 8 is an operational view of the actuation button shown in FIG. 1 in the locked and momentary locked positions.

REFERENCE NUMERALS IN DRAWINGS

20 Lunge Line Controller
22 Housing
24 Handle
26 Reel
28 Latch Means
30 Retracting Spring
32 Elongated Flexible Tape
34 Free End of Tape
36 Clip
38 Actuating and Locking Button
40 Mating Housing Section (First)
42 Mating Housing Section (Second)
44 Perpendicular Sidewall
46 Circular Ledge
48 Circular Well
50 Bottom Wall
52a Thicker Sidewall At Top End (Section 40)
52b Thicker Sidewall at Bottom End (Section 40)
53a Thicker Sidewall At Top End (Section 42)
53b Thicker Sidewall at Bottom End (Section 42)
54 Latch Means Opening
56 Opposing Pair of Sidewalls
58 Guide Shaft
60 Shaft
62 Shaft Slot
64 Top End of Shaft
66 Shaft Screw Hole
68a Circular Ridge in Section 40
68b Circular Ridge in Section 42
70 Mouthpiece
72 Oblong Opening In Mouthpiece
74 Circular Recess
76 Receptacle
78 Annular Wall
80 Receptacle Screw Hole
82a Locating Pin
82b Locating Pin
84a Locating Pin Hole
84b Locating Pin Hole
86 Shaft Screw
88a Threaded Screw Hole
88b Threaded Screw Hole
88c Threaded Screw Hole
90a Screw Hole
90b Screw Hole
90c Screw Hole
92a Securing Screw
92b Securing Screw
92c Securing Screw
93 Circular Central Cavity
94 Planar Wall
96 Cylindrical Central Hub of Reel
98a First Annular Cavity
98b Second Annular Cavity
100 Central Opening In Reel
102 Inner Surface of Hub
104 Outer Surface of Hub
106 Planar Circular Flange
108 Outer Circumference of Flanges
110 Annular Recess In Flanges
112 Teeth
114 Inner End of Spiral Spring
116 Outer End of Spiral Spring
118 Elongated Tab on Spring Holder
120 Spring Holder
122 Groove in Hub
124 Projection on Spring Holder
126 Inner End of Tape
127 Pin
128 Oblong Opening in Hub
130 Back Sidewall
132 Resilient Means
134 Back Rectangular Portion
136 Transverse Rectangular Portion
138 Projecting Fingers
140 Slope
142 Angled Outer End
144 Locking Notch
146 Spring Opening
148 Oval Guide Slot

DESCRIPTION-FIGS. 1-8

Figure 3:
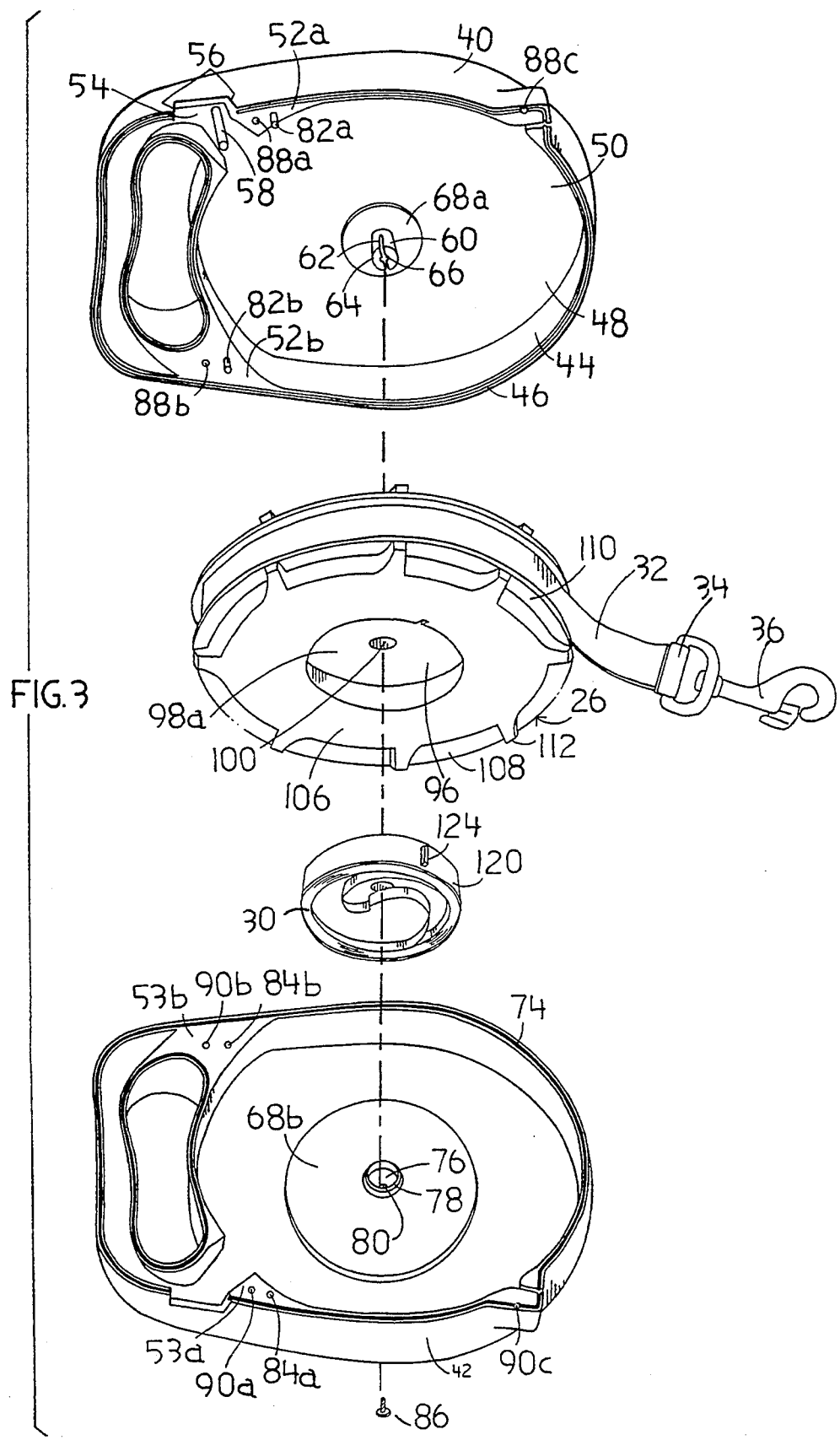
FIG. 3 is an exploded perspective view of the lunge line controller shown in FIG. 1.

In accordance with the present invention we provide a lunge line controller 20 (FIG. 1) which includes a housing 22, also shown in FIG. 3, equipped with an opening which forms a handle 24. Housing 22 receives a tape winding reel 26, a latching means 28 (FIG. 1), a retracting spring 30 coupled to reel 26, and an elongated flexible tape 32 secured to and wound on reel 26. Tape 32 has a free end 34 that extends out of the housing 22 on which a clip 36 is secured. Reel 26 is rotatably mounted within housing 22. When reel 26 rotates in one direction, tape 32 is paid-out, and when reel 26 rotates in the opposite direction, tape 32 is retracted into housing 22.

As will be described in detail later, controller 20 is constructed to allow three operating positions.

In the first operating position latch 28 (FIG. 5) is in the release position whereby tape 32 can be either paid-out or retracted. Tape 32 is automatically retracted into housing 22 if the tension on tape 32 is less than the force of retracting spring 30, e.g., the animal's pull is less than the force of retracting spring 30. In the second operating position (FIG. 8), latch 28 is engaged and locked into position, effecting a locking of reel 26 in both directions of rotation. In the third operating position latch 28 is engaged by effecting a locking of reel 26 in both directions of rotation only when the operator holds latch 28 in position.

Housing 22

Figure 1:
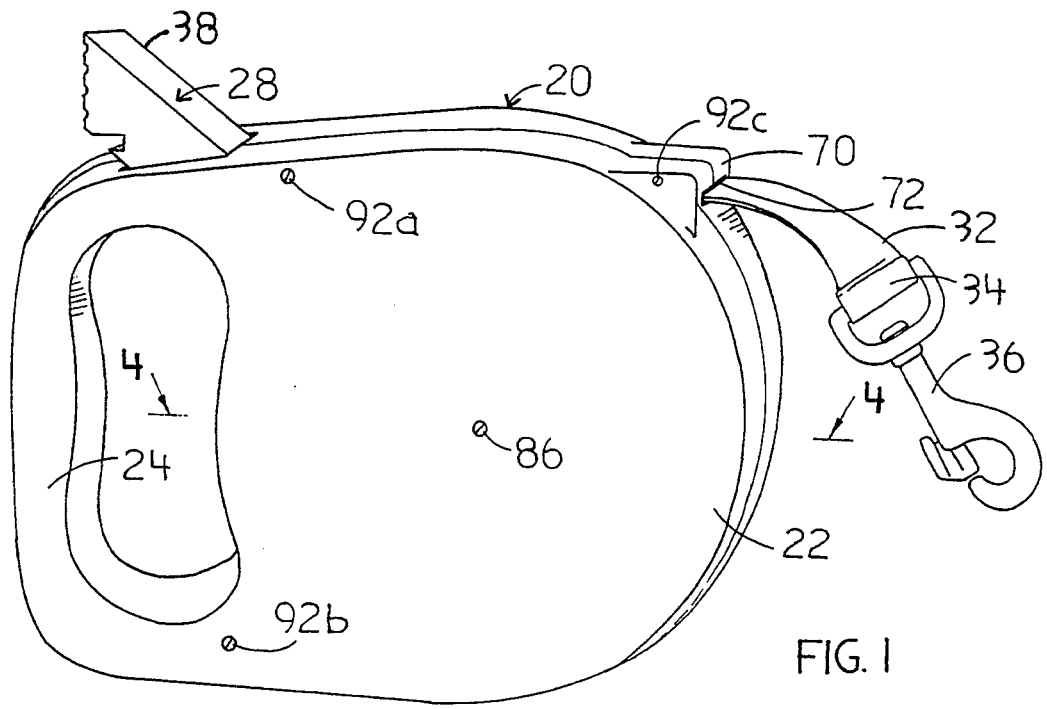
FIG. 1 is a perspective view of a lunge line controller of the present invention.

Housing 22 (FIG. 3) comprises a pair of mating sections 40 and 42. Each section is a generally hollow member consisting of a circular portion to house reel 26 extending to the half circle portion comprising handle 24. Handle 24 is substantially concentric with the center of housing 22. Section 40 includes a peripheral perpendicularly extending sidewall 44 with a circular ledge 46 on top. Sidewall 44 forms a circular well 48 with a bottom wall 50. Sidewall 44 is thicker at its top and bottom ends 52a and 52b, top end 52a includes an outlet or latch opening 54 in the form of an opposing pair of sidewalls 56. In alignment with opening 54 between the circular and handle portions of housing section 40 is an upwardly projecting guide shaft 58. Opening 54 and guide shaft 58 are adapted to receive a button (to be described in detail later) forming a portion of latch 28. Bottom wall 50 of section 40 includes an upwardly projecting shaft 60 located at the center of circular well 48. Shaft 60 includes a slot 62 extending parallel to the longitudinal axis of shaft 60 which opens at a top end 64 of shaft 60. The perpendicular corners of slot 62 are rounded to exert less strain on retracting spring 30. Top end 64 of shaft 60 is planar and includes a threaded hole 66. From bottom wall 50 a circular ridge 68a encircles shaft 60. At the top of section 40 opposite handle 24 extends a mouthpiece 70 with an oblong opening 72 for extension of tape 32 (FIG. 1).

Housing section 42 (FIG. 3) is of similar overall shape to section 40 and includes sidewall 44 with a circular recess 74. Sidewall 44 forms circular well 48 with bottom wall 50. Sidewall 44 is thicker at its top and bottom ends 53a and 53b. Top end 53a includes latch opening 54 in the form of opposing pair of sidewalls 56. Bottom wall 50 of section 42 has a receptacle 76 to keep shaft 60 properly aligned. Receptacle 76 includes an annular wall 78 which defines a recess in receptacle 76 that receives top end 64 of shaft 60. A receptacle screw hole 80 extends through the center of section 42 through receptacle 76. Hole 80 is aligned with shaft screw hole 66 in shaft 60 when sections 40 and 42 are mated. From the bottom wall 50 a circular ridge 68b encircles receptacle 76. Also at the top of hoeing section 42 opposite handle 24, mouthpiece 70 extends and has an oblong opening 72 for extension of tape 32.

Alignment of housing sections 40 and 42 is accomplished by locating pins 82a and 82b, which project from thicker sidewalls 52a and 52b of housing section 40. Locating pins 82a and 82b are received in complementary locating pin holes 84a and 84b, respectively, which are located in thicker sidewall portion 53a and 53b of housing section 42. Sections 40 and 42 are arranged to be mated with circular ledge 46 of section 40 disposed within circular recess 74 of section 42. Mouthpiece 70 and latch means opening 54 of each section are then disposed opposite one another to form two passageways. Tape 32 passes through opening 72 in mouthpiece 70. Latch 28, in the form of an actuation and locking button, passes through opening 54. When housing sections 40 and 42 are mated, opening 54 includes a back forward sidewall 130 which forms a portion of latch 28.

To secure housing sections 40 and 42 together, a shaft screw 86 extends through receptacle screw hole 80 in section 42 and into threaded screw hole 66 in shaft 60 in section 40 (FIG. 3). To further secure housing sections 40 and 42 together, threaded screw holes 88a, 88b, and 88c in housing section 40 are aligned with screw holes 90a, 90b, and 90c, respectively, in section 42 when sections 40 and 42 are mated. Securing screws 92a, 92b, and 92c (FIG. 1) extend through screw holes 90a, 90b, and 90c, respectively, in section 42 and are received in threaded screw holes 88a, 88b, and 88c, respectively, in section 40.

When sections 40 and 42 are secured together, mouthpiece 70 forms a passageway complementary to the oblong shape of elongated flexible tape 32. Oblong opening 72 for mouthpiece 70 is preferred as this shape allows a flat tape to be expelled or retracted without folding over itself. It also minimizes the amount of debris that is pulled into housing 22 with tape 32.

When sections 40 and 42 are secured together, a housing having a circular central cavity 93 is created. (FIG. 4). Reel 26, tape 32 and retracting spring 30 are all located within cavity 93.

Reel 26

Reel 96 (FIGS. 4 and 5) is of generally circular shape and includes a planar wall 94. Planar wall 94 is parallel to and separates a cylindrical central hub 96 into two annular cavities, 98a and 98b, on either side of planar wall 94. Retracting spring 30 is located in the first annular cavity 98a and tape 32 is secured to reel 26 in cavity 98b. Planar wall 94 has a central opening 100 through which shaft 60 extends. Planar wall 94 continues to extend perpendicularly into second annular cavity 98b around shaft 60.

Central hub 96 has an inner surface 102 and an outer surface 104. A planar circular flange 106 extends from either side of outer surface 104. On the outer circumference of flanges 108 is an annular recess 110 that excludes the projection of evenly spaced teeth 112. Teeth 112 are spaced evenly around outer circumference 108 of outside of flanges 106. Preferably approximately 6 teeth are provided on each flange 106. If fewer teeth are used, the sudden jolt from engaging the locking mechanism when the tape 32 is retracting can be severe.

Reel 26 is located within circular central cavity 93 formed in housing 22, with shaft 60 of housing section 40 extending through central opening 100 in reel 26. Thus, shaft 60 forms an axle about which reel 26 is enabled to rotate. Circular ridges 68a and 68b (FIG. 3) on housing sections 40 and 42, respectively, allow reel 26 to rotate without contacting bottom wall 50 in each section 40 and 42. These ridges 68a and 68b reduce friction that will interfere with the rotation of reel 26.

Retracting Spring 30

Retracting spring 30 is in the form of a helical spring which comprises a web of resilient material, preferably spring steel, coiled into a spiral and disposed in a circular spring holder 120. Preferably spring 30 provides a constant force so as to allow tape 32 to be payed-out and retracted to any length with approximately the same amount of force.

Retracting spring 30 in spring holder 120 is disposed in first annular cavity 98a and has an inner end portion 114 which is engaged in slot 62 in shaft 60. An outer end portion 116 of spring 30 has a hole which locks over an elongated projecting tab 118 located on the inner surface of spring holder 120. Fastening of spring 30, however, to spring holder 120 or reel 26 can be achieved in any convenient fashion.

Located in the inner surface of hub 102 in first annular cavity 98a of reel 26 is a groove 122. On the outside of spring holder 120 is a projection 124 complementary to the shape of groove 122 which extends perpendicularly to spring holder 120. When projection 124 is received in groove 122, rotation of spring holder 120 in first annular cavity 98a of reel 26 is prevented.

Flexible Tape 32

Flexible tape 32 comprises an elongated web of flexible material, such as nylon or cotton. Tape 32 is secured to and wound in a spiral about outer surface 104 of hub 96 of reel 26. Inner end 126 of tape 32 (FIG. 4) extends through an oblong opening 128 in outer surface 104 of hub 96 through to second annular cavity 98b. Inner end 126 of tape 32 is folded back over itself, forming a loop. The abutting tape portion of tape 32 is secured by a suitable means, such as stitching, adhesive, etc. A pin 127 is then inserted through the loop. Pin 127 is of such size that when inserted through the loop, tape 32 cannot be pulled out of second annular cavity 98b through oblong opening 128, thus securing tape 32 to the reel. Tape 32 is wound in a spiral about outer surface 104 of hub 94 in the same direction as that of spring 30.

Free end 34 of tape 32 extends out of mouthpiece 70 of housing 22 (FIG. 1). Clip 36 can be of any suitable type and is attached to the free end of tape 32 by folding tape 32 back over itself about clip 36 and securing the abutting tape portion by suitable means, e.g., adhesive, stitching etc.

Latch 28

Latch 28 (FIGS. 5, 6, and 7) comprises actuating and locking button 38 and a resilient means 132 in the form of a compression spring. Button 38 is basically comprised of two rectangular shaped portions, a back rectangular portion 134 and a transverse rectangular portion 136.

Back portion 134 extends to transverse portion 136 by means of a slope 140 located on either side of button 38. Outer end 142 of back portion 134, which extends out of latch opening 54 of housing 22, is angled having said angled outer end 142 allows comfortable maneuverability of button 38 by the operator. On the underside of back portion 134 is a locking notch 144. Locking notch 144 is a slanted rectangular notch that spans the width of back portion 134 of button 38.

Projecting from either side of the inner end of transverse rectangular portion 136 are two projecting fingers or pawls 138. These fingers 138, when engaged, serve to interfere with teeth 112 on reel 26, preventing rotation of reel 26 in either direction. Since fingers 138 engage teeth 112 located on both sides of reel 26 flanges 106, the pull on housing 22 is uniform and does not allow the housing 22 to twist in the operator's hand. This feature provides maximum control and reliability for the operator and is preferred.

Button 38 is biased by compression spring 132. Compression spring 132 is inserted into a spring opening 146 located in the inner end of transverse portion 136 of button 38 between projecting fingers 138. Compression spring 132 extends into spring opening 146 and is compressed between the back of spring opening 146 and guide shaft 58 in housing section 40 to provide biasing force for button 38. On the side and extending through transverse portion 136 is an oval guide slot 148. Guide slot 148 is positioned over guide shaft 58. This configuration allows fingers 138 of button 38 to be moved along the path necessary to engage and disengage teeth 112 of reel 26.

Operation of Invention—FIGS. 1, 2, 5, 8

Operation from Tape Release Position to Tape Locked Position

Figure 2:
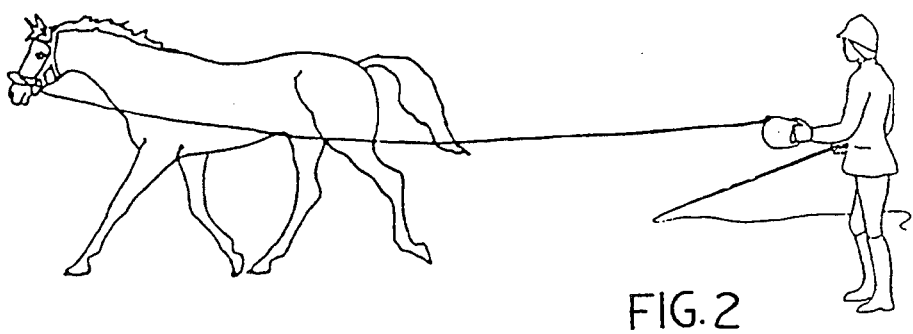
FIG. 2 is a perspective view of the lunge line controller in use for lunging a horse.

When tape 32 is not in use, it is enclosed in housing 22, as indicated in FIG. 1. When operation of lunge line controller 20 is desired, the operator grasps handle 24 and then attaches clip 36 to the animal's halter, bridle, etc. as shown in FIG. 2. With actuation and locking button 38 in the relaxed or "release position" (FIG. 5) the operator then urges the animal to move away and commence circling (lunging) around the operator for exercise or training purposes (FIG. 2). As tape 32 is pulled out by the animal against the tension of spring 30, spring 30 tightens. When the animal has achieved the desired circumference, the operator can use the thumb of the same hand that is grasping handle 24 to push button 38 toward housing 22 (FIG. 8). This action compresses resilient means 132 and moves fingers 138 of button 38 into the path of teeth 112 on reel 26, halting rotation of reel 26 about shaft 60. This prevents further pay-out or retraction of tape 32. Pushing button 38 toward housing 22 also engages locking notch 144 with back sidewall 130 of housing 22. This locks reel 26 against rotation even if the operator releases pressure on button 38.

Operation from Tape Locked Position to Tape Release Position

When the operator is finished lunging or desires to lunge the animal in the opposite direction, button 38 can be unlocked by pushing it upwardly. This action disengages locking notch 144 from back sidewall 130. Resilient means 132 pushes the button back to the "release position" which disengages projecting fingers 138 from teeth 112 and allows rotation of reel 26. The operator then moves toward the animal, causing a slack, or decreased tension, on tape 32. Retracting spring 30, now having decreased tension, retracts tape 32 into housing 22. The operator then can urge the animal in the other direction and commence lunging or engage the lock function by again pushing button 38 toward housing 22 with tape 32 expelled to the desired length.

If the operator desires to keep tape 32 taut and not to allow any slack during the lunging process, button 38 is left in the relaxed or "released position" (FIG. 5). This position allows spring 30 to create tension on tape 32, which ensures that no excess slack is allowed in tape 32. This greatly decreases the chance of tape 32 becoming entangled with the operator or animal.

Operating the Tape Momentary Locked Position

The momentary locked position is achieved by pushing button 38 upwardly with the operator's thumb (FIG. 8). This motion does not allow locking notch 144 to engage back sidewall 130 of housing 22, but does push fingers 138 in the path of teeth 112. Thus reel 26 will be locked against pay-out or retraction only for the duration of time that the operator keeps button 38 pushed upwards.

The momentary locked position can he used for a variety of requirements. For example, if the operator wishes to lunge an animal with the lunge line in the released position, it is still necessary to establish the size of the circle desired. Once the animal has moved to the desired circumference, the operator can push button 38 upwardly for the momentary locked position and then release button 38 once the animal is no longer exerting tension. Also, since distance varies for various training techniques, the momentary-locking capability is desirable when continuous tape 32 pay-out and retraction is necessary.

Another example in which the momentary-locking position is desirable is in the event the animal suddenly pulls away. The momentary-locking position can be engaged by keeping button 38 pushed upwards until the animal is again under control, but quickly released if additional time is necessary for the operator to get a firmer grip on handle 24, or to achieve firmer footing to brace against the animal's pull.

Once the lunging or other activity is complete, the operator moves toward the animal with button 38 in release position. Spring 30 will retract remaining tape 32 into housing 22 (FIG. 1.). Clip 36 is removed from the animal's halter or bridle. The controller 20 can now be conveniently stored without danger of tape 32 coming unwound or tangled. This method is desirable over the time-consuming methods of rolling or wrapping conventional lunge lines by hand.

Operation for Driving

Controller 20 can also be used for purposes other than lunging. For example, "driving" is another means used in the training of horses. Driving requires two flexible tapes 32. Each tape attached to a respective side of the halter or bridle (not shown). Then the tapes are normally passed through a ring located on the saddle or surcingle. (A surcingle is similar to a girth but has rings attached for the purpose of running tapes through for driving or to clip on other training devices.) The operator grasps both tapes 32 and walks behind the animal, controlling the animal's direction by pulling or releasing one or the other of tapes 32. For example, if the operator wants the horse to turn left, the left tape would be pulled, which would move the horse's head left, urging the horse to turn left. Since the practice of driving a horse requires two tapes, the chance of entanglement around the operator's or horse's legs from using conventional tapes is substantial. Using two lunge line controllers 20 helps to solve this problem.

Conclusion, Ramifications, and Scope of Invention

Accordingly, the reader will see that our lunge line controller provides a much safer method of lunging for both the animal and the operator than existing counterparts. In addition, the retractable lunge line provides a highly reliable, highly durable, reasonably lightweight, and economical device that can be easily used by persons of almost any age. The reader can further appreciate the simplicity of the actuation and locking button design along with the three separate functions it performs, i.e, release, locking, and momentary-locking positions, all of which can be operated with one hand. The angled corrugated surface of the actuation and locking button provides the operator the ability to easily perform these separate functions with a quick push from the operator's thumb. The reel construction, consisting of approximately 6 teeth provided on both sides of the flange, that provides a smooth and uniform pull on the housing is yet another feature the reader can appreciate. Further, the oblong shape of the mouthpiece opening conforming to the shape of the flexible tape's allows the tape to enter the housing smoothly without twisting or carrying in excess debris. Further, the method of inserting a pin into a loop formed in the tape end to secure tape to the reel allows for quick assembly and ensures tape will not be pulled from the housing. Finally, the reader can appreciate the retractable lunge line's simplicity of operation and convenient, organized storage of the flexible tape.

While our above description contains many specificities, these should not be construed as limitations on the scope of the invention, but rather as an exemplification of one preferred embodiment thereof. Many other variations are possible. For example, the housing can have other shapes, such as oval, and the handle can be designed in a variety of shapes and sizes. The housing sections can be secured together in a different manner, such as using bolts or adhesives. The housing and reel can be made of plastic formed by injection or vacuum molding, as is the preferred method of this invention, but can easily be manufactured from other materials such as metal. The reel can be of a different size and include a varied number of teeth, etc. and the flexible tape can be made in a variety of sizes, lengths, colon and material. Although the method of securing the tape to the reel described using a pin inserted through the tape loop is believed to be superior, other methods can be used, such as adhesive or tape knotting.

The retractable lunge line can he used for functions other than the examples heretofore mentioned. It can, for example, he used for leading a horse or other animal such as a dog or cat. In addition, the retractable lunge line can be used for tying an animal to allow free (actuating button in "release position") or restricted range movement (actuating button in "locked position"). The retractable lunge line can be used for any other general need in which a flexible tape is required or the retractable feature could be useful, such as a clothesline.

Thus the scope of the invention should be determined by the appended claims and their legal equivalents, rather than by the examples given.

What is claimed as the invention is:

1. A retractable lunge line controller, comprising:
   a housing containing a rotatable reel,
   a tape wound around said reel and having a free end extending out of said housing,
   a clip being secured to said free end of said tape,
   retracting means for urging said reel in one direction of rotation so as to wind said tape around said reel within said housing,
   latch means coupled to said reel,
   said reel containing a plurality of teeth for engagement with said latch means,
   said latch means comprising an actuation and locking button,
   resilient means arranged to bias said button to an outward position with respect to said housing,
   said button including a pawl on an inner end thereof for engagement with said teeth whereby when said button is pressed inwardly against the bias of said resilient means said pawl engages with said teeth preventing rotation of said reel, and when said resilient means biases said button to said outward position, said pawl will not engage said teeth so that said reel can rotate in either direction,
   said button includes a notch whereby providing a means for locking said button in said inward position,
   said housing includes an opening for said button, said opening includes a back sidewall whereby when said button is pressed inward toward said housing, said notch on said button engages with said back sidewall locking said button in said inward position.

2. The retractable lunge line controller of claim 1 further including a central shaft attached to said housing and rotatably supporting said reel, said shaft includes a slot extending parallel to the longitudinal axis of said shaft, the perpendicular corners of said slot are rounded, whereby less stress is exerted on said retracting means that is secured in said slot by allowing said retracting means to bend about a rounded surface rather than a sharp right-angled surface.

3. The retractable lunge line controller in claim 2, wherein said housing includes a ridge about said shaft, whereby said reel is allowed to rotate about said shaft without friction from contacting said housing.

4. The retractable lunge line controller in claim 3 wherein the diameter of said ridge is greater than the opening provided in said reel for said retracting means, whereby said ridge will not allow said retracting means to exit the opening, whereby eliminating the need for a retracting means cover.

5. The retractable lunge line controller in claim 2 wherein said housing is formed of molded plastic as said shaft is integrally formed in said housing.

6. A retractable lunge line controller, comprising:
a housing containing a rotatable reel,
a tape wound around said reel and having a free end extending out of said housing,
a clip being secured to said free end of said tape,
retracting means for urging said reel in one direction of rotation so as to wind said tape around said reel within said housing,
latch means coupled to said reel,
said reel containing a plurality of teeth for engagement with said latch means,
said latch means comprising an actuation and locking button,
resilient means arranged to bias said button to an outward position with respect to said housing,
said button comprised of a substantially rectangular back portion that extends from said housing and includes a locking notch on the underside thereof,
said button includes a pawl on an inner end thereof whereby when said button is pressed inwardly against the bias of said resilient means said pawl interferes with said teeth preventing rotation of said reel, and when said resilient means biases said button to said outward position, said pawl will not interfere with said teeth allowing said reel to rotate in either direction,
said housing includes an opening for said button, inherent in said opening is a back sidewall onto which said notch engages whereby providing a locking means for locking said button in an inward position preventing rotation of said reel.

7. The retractable lunge line controller in claim 6 wherein an outer end of said button includes an angled surface whereby when pressed, urges said button upward in respect to said housing, allowing said pawl to interfere with said teeth for the duration said surface is pressed but does not allow said notch to engage with said back sidewall.

8. The retractable lunge line controller in claim 6 wherein said tape is attached to said housing by extending an inner end of said tape through said reel, folding said inner end of said tape back over itself to form a loop, inserting a pin lengthwise through the loop formed in said tape, whereby said pin prevents said tape from exiting said reel.

* * * * *